United States Patent
Handl

(10) Patent No.: US 9,695,047 B2
(45) Date of Patent: Jul. 4, 2017

(54) PROCESS FOR PRODUCING FINE, MORPHOLOGICALLY OPTIMIZED PARTICLES USING JET MILL, JET MILL FOR USE IN SUCH A PROCESS AND PARTICLES PRODUCED

(71) Applicant: TOTAL RESEARCH & TECHNOLOGY FELUY, Seneffe (BE)

(72) Inventor: Werner Handl, Altdorf (DE)

(73) Assignee: Total Research & Technology Feluy, Seneffe (BE)

(*) Notice: Subject to any disclaimer, the term of this patent is extended or adjusted under 35 U.S.C. 154(b) by 0 days.

(21) Appl. No.: 14/774,242

(22) PCT Filed: Mar. 11, 2014

(86) PCT No.: PCT/EP2014/054739
§ 371 (c)(1),
(2) Date: Sep. 10, 2015

(87) PCT Pub. No.: WO2014/140038
PCT Pub. Date: Sep. 18, 2014

(65) Prior Publication Data
US 2016/0023907 A1 Jan. 28, 2016

(30) Foreign Application Priority Data
Mar. 11, 2013 (DE) .................. 10 2013 004 223

(51) Int. Cl.
*C01B 31/04* (2006.01)
*B02C 19/06* (2006.01)
*C01B 21/064* (2006.01)
*B02C 23/06* (2006.01)
*C01B 31/00* (2006.01)

(52) U.S. Cl.
CPC ............ *C01B 31/04* (2013.01); *B02C 19/061* (2013.01); *B02C 23/06* (2013.01); *C01B 21/064* (2013.01); *C01B 21/0648* (2013.01); *C01B 31/00* (2013.01); *C01B 2204/32* (2013.01); *C01P 2004/51* (2013.01); *C01P 2004/61* (2013.01); *C01P 2006/12* (2013.01)

(58) Field of Classification Search
CPC ....... B02C 19/061; B02C 23/06; C01B 31/04; C01B 21/064; C01B 31/00; C01B 21/0648; C01B 2204/32; C01P 2006/12; C01P 2004/61; C01P 2004/51
USPC .......................................... 428/402; 241/1, 39
See application file for complete search history.

(56) References Cited

U.S. PATENT DOCUMENTS

| | | | |
|---|---|---|---|
| 4,533,086 A | 8/1985 | Junttila | |
| 5,683,039 A | 11/1997 | Leute et al. | |
| 6,287,694 B1 * | 9/2001 | Zaleski | H01M 4/625 423/448 |
| 2008/0206124 A1 * | 8/2008 | Jang | B82Y 30/00 423/415.1 |
| 2012/0298782 A1 * | 11/2012 | Nied | B02C 19/068 241/5 |
| 2012/0304892 A1 | 12/2012 | Honert et al. | |

FOREIGN PATENT DOCUMENTS

| | | |
|---|---|---|
| DE | 7617063 U1 | 9/1981 |
| EP | 1015117 B1 | 2/2003 |
| EP | 1717888 * | 11/2006 |
| EP | 1717888 A1 | 11/2006 |
| WO | 9946437 A1 | 9/1999 |
| WO | WO99/64637 * | 9/1999 |
| WO | 2008046403 A1 | 4/2008 |
| WO | 2011161447 A1 | 12/2011 |

OTHER PUBLICATIONS

International Search Report issued in PCT/EP2014/054739, dated Jun. 20, 2014, 3 pages.
Japan Society for the Promotion of Science, 117th Board, p. 46 to 63, "Experiment Technology of Carbon (I)" edited by Carbon Society of Japan, Kagaku Gijutsu-Sha, Jun. 1, 1978.

* cited by examiner

*Primary Examiner* — Leszek Kiliman
(74) *Attorney, Agent, or Firm* — Albert Shung

(57) ABSTRACT

A process for producing fine particles with a high aspect ratio and/or a low specific surface area includes use of a jet mill. An alkaline grinding aid is added to a grinding gas before the grinding gas is fed into a grinding chamber of the jet mill. The process includes micronization of particles of layered structure material having an interplanar distance ranging from 0.30 nm to 0.40 nm as measured by X-ray diffraction method.

17 Claims, 2 Drawing Sheets

PROCESS FOR PRODUCING FINE, MORPHOLOGICALLY OPTIMIZED PARTICLES USING JET MILL, JET MILL FOR USE IN SUCH A PROCESS AND PARTICLES PRODUCED

CROSS REFERENCE TO RELATED APPLICATIONS

This application is a National Stage Entry of PCT/EP2014/054739, filed on Mar. 11, 2014, which claims priority to DE 10 2013 004 223.2, filed on Mar. 11, 2013, the entireties of which are incorporated herein by reference.

FIELD OF THE INVENTION

The present invention relates to processes for the dry grinding of particles by means of jet mill. The invention also relates to jet mills used to perform such processes.

BACKGROUND

Jet mills are known for performing micronisation of powder or particle material. Different kind of jet mills are available such as for example fluidized bed jet mill or spiral jet mill.

FIGS. 1A and 1B relate to conventional air spiral jet mills. They consist of a flat, cylindrical grinding chamber (3), into which the grinding gas flows tangentially by way of multiple grinding nozzles (2). The product to be ground is fed in by way of the opening (4) and the grinding gas is fed in under pressure into the collecting opening (1). The grinding gas is distributed among the individual nozzles (2), which are distributed over the circumference of the mill, and blown into the grinding chamber (3). The nozzles (2) are pre-set at a suitable angle which creates a spiral flow in the grinding chamber (3). The material to be ground is transported for example by means of a feed screw from a hopper into the grinding chamber and mixed there with the grinding gas to form a stream of gas and solid matter and is accelerated in the grinding chamber. The ground particles are discharged by way of classifier (5).

All known processes for micronisation have the objective of achieving the greatest possible throughput with the smallest possible fineness particle. The processes that are designed purely for cost-effectiveness largely disregard the morphological properties of the particles, such as the particle form and the specific surface area. These properties are of importance as they largely influence the later rheological and physical characteristics of the particle. Thus, in the case of graphite for example, the electrical and the thermal conductivity can be influenced. By producing carbons in flake form with a smooth surface, it could be possible for example to improve the reflectivity, and to use the flakes as a pigment or as an athermanous material in heat insulating systems.

The nature of the collision between particles, the acceleration energy and the chemical-atmospheric conditions in the grinding chamber are of importance. Therefore, numerous methods have been proposed for changing the grinding conditions in jet mills.

It is known from DE 7617063 that the angles and the nozzle arrangements of the nozzles are of importance and a nozzle ring has been proposed for easier exchange, better cleaning and noise damping. However, the particle morphology cannot be influenced in this way.

It is proposed in WO 2008046403 to use steam, hydrogen gas or helium gas as grinding gases as they can reach a higher sonic velocity than air (343 m/s) as the fluid. A velocity of at least 450 m/s is disclosed. On account of the different densities and viscosities of the gases, the gas velocity can be significantly increased, but cost-effective grinding operation is no longer possible in terms of safety and costs, at least in the case of hydrogen gas and helium gas. No teaching is given regarding a possible influence on the particle morphology by the cited grinding gases.

To increase the throughput capacity, grinding aids have also been proposed. The use of grinding aids is sufficiently well known. According to the present state of the art, they are used primarily for increasing the throughput in ball mills, as is the case for example when grinding clinker/cement. Most of the known grinding aids concern wet grinding in ball mills or in agitator ball mills. The grinding of graphite in a liquid is described for example in U.S. Pat. No. 4,533,086.

Glycols, glycol derivatives, carboxylic acids and wetting agents are described for example in US 2012304892 and in WO 2011161447. However, these additives concern the grinding of clinker or cement and are not used in jet mills.

EP 1015117 describes the use of different grinding gases, but merely involves drying a slurry by means of a vortex mill.

Therefore, there is still a need for a cost-effective process for grinding particles in dry grinding processes in which fine and morphologically optimized particles are produced.

It is an object of the present invention to provide a process and an apparatus for grinding particles in a cost effective way in which fine and morphologically optimized particles with a reduced specific surface area and/or with high aspect ratio are produced.

It is an object of the present invention to provide a process and an apparatus to improve the particle morphology in a cost-effective way.

It is also an object of the invention to provide fine and morphologically optimized particles, i.e. micronized particles with a reduced specific surface area and/or high aspect ratio.

SUMMARY OF THE INVENTION

The present invention provides a process for grinding particles comprising the steps of:
providing a jet mill comprising a grinding chamber and at least one jetting nozzle to feed grinding gas into said grinding chamber;
providing particles of layered structure material having an interplanar distance ranging from 0.30 nm to 0.40 nm as measured by X-ray diffraction method into the grinding chamber,
feeding grinding gas under pressure to the grinding chamber through the at least one jetting nozzle to perform the micronisation of the particles, and
collecting micronized particles,
wherein the process further comprises the step of adding an alkaline grinding aid to the grinding gas before said grinding gas is fed into the grinding chamber.

The X-ray diffraction method to measure the interplanar distance is wellknow to the man skilled in the art. It has been formulated by Japan Society for the Promotion of Science, 117th Board, p 46 to 63, "Experiment Technology of Carbon (I)" edited by Carbon Society of Japan, Kagaku Gijutsu-Sha, Jun. 1, 1978.

The present invention is also directed to a jet mill for grinding particles of layered structure material according to the above process, the jet mill comprising:
  means to feed particles for grinding,
  a grinding chamber for the micronisation of the particles,
  at least one jetting nozzle to feed grinding gas into said grinding chamber;
  means to fed grinding gas under pressure to the at least one jetting nozzle,
  means to discharge the micronized particles,
wherein the jet mill further comprises means for adding grinding aid to the grinding gas upstream the at least one jetting nozzle.

The layered structure material has an interplanar distance ranging from 0.30 nm to 0.40 nm as measured by X-ray diffraction method.

A suitable mean to perform the addition is for example an injector. The jet mill comprises an opening to feed the grinding gas, and preferably the injector is arranged to inject the grinding aid in this opening. Thus the grinding gas and the grinding aid are fed simultaneously in the jet mill but from separate sources. By such a configuration, the grinding gas is added with the grinding aid before being distributed among the at least one jetting nozzle.

The invention is further directed to the use of the above process and/or jet mill for grinding particles to produce micronized particles of an average particle size $d_{50}$ less than 20 μm determined according to ISO 13320, from a layered structure material having an interplanar distance ranging from 0.30 nm to 0.40 nm as measured by X-ray diffraction method, having:
  a specific surface area according of less than 15 $m^2/g$, preferably less than 10 $m^2/g$, the specific surface area being determined by BET according to DIN 66131, and/or
  an aspect ratio of greater than 2, preferably of greater than 10, more preferably of greater than 20, the aspect ratio being the ratio of the circular diameter of the area of the micronized particle to the thickness of said particle.

Finally the invention is further directed to micronized particles, of an average particle size $d_{50}$ less than 20 μm, having:
  a specific surface area according of less than 15 $m^2/g$, preferably less than 10 $m^2/g$, the specific surface area being determined by BET according to DIN 66131, and/or
  an aspect ratio of greater than 2, preferably of greater than 10, more preferably of greater than 20, the aspect ratio being the ratio of the circular diameter of the area of the micronized particle to the thickness of said particle,
wherein said particles are obtained from a layered structure material having an interplanar distance ranging from 0.30 nm to 0.40 nm as measured by X-ray diffraction method, said particles being preferably selected from the group consisting of natural graphite, synthetic graphite, petroleum coke, pitch coke, anthracite, hexagonal boron nitride and clay minerals.

In a preferred embodiment of the process of the invention, of the jet mill of the invention, of the use of the process and/or the jet mill of the invention and/or of the micronized particles of the invention, the layered structure material is a carbonaceous layered structure material having an interplanar distance ranging from 0.30 nm to 0.40 nm as measured by X-ray diffraction method.

DETAILED DESCRIPTION OF THE INVENTION

Figures 1A, 1B:
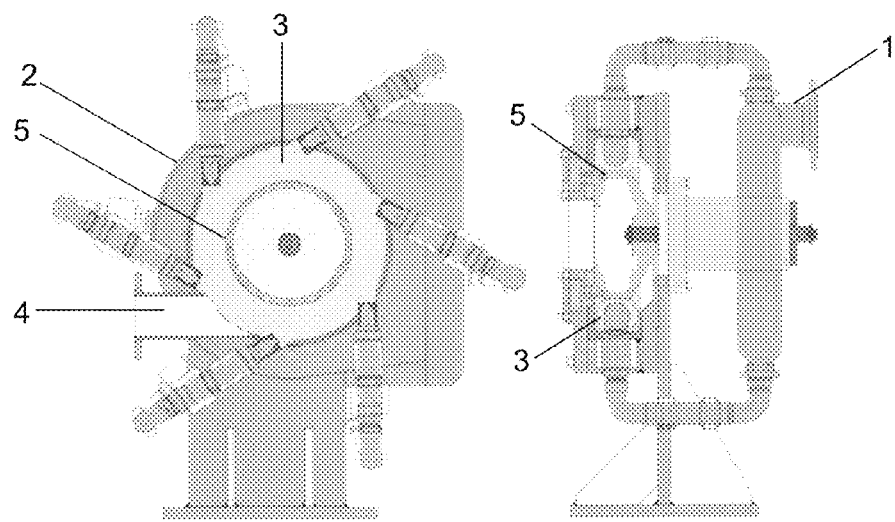
FIGS. 1A and 1B are schematic representations of a conventional air spiral jet mill

In the following passages, different aspects of the invention are defined in more detail. Any feature indicated as being preferred or advantageous may be combined with any other feature or features being indicated as being preferred or advantageous.

The process of the invention is a process for grinding particles comprising the steps of:
  providing a jet mill comprising a grinding chamber and at least one jetting nozzle to feed grinding gas into said grinding chamber;
  providing particles of layered structure material having an interplanar distance ranging from 0.30 nm to 0.40 nm as measured by X-ray diffraction method into the grinding chamber,
  feeding grinding gas under pressure to the grinding chamber through the at least one jetting nozzle to perform the micronisation of the particles, and
  collecting micronized particles,
wherein the process further comprises the step of adding an alkaline grinding aid to the grinding gas before said grinding gas is fed into the grinding chamber.

According to a preferred embodiment of the invention, the grinding gas is air or steam, preferably the grinding gas is air. In the context of the invention air is to be understood as compressed air.

The process of the invention is particularly useful for performing grinding of layered structure material, such as for example natural graphite, synthetic graphite, petroleum coke, pitch coke, anthracite, hexagonal boron nitride and clay minerals.

Indeed, it has surprisingly been found that in the case of particles of layered structure material the addition of a grinding aid is conducive to directionally dependent comminution. In particular, the addition of alkaline grinding aids displays a delaminating effect.

In a preferred embodiment of the invention, the alkaline grinding aid is ammonia gas. However other alkaline gases can be used such as for example amines gases which are derivatives of ammonia. In amine gases, one or more hydrogen atoms have been replaced by a substituent such as an alkyl or aryl group.

Indeed, it has particularly surprisingly been found that, even with very small proportionate amounts below what is known as the annoyance threshold of 250 ppm (175 $mg/m^3$), ammonia gas has a highly delaminating effect. Therefore in a further preferred embodiment of the invention, the alkaline grinding aid, being preferentially ammonia gas, is added to the grinding gas in a concentration ranging from 5 to 500 $mg/m^3$ relative to the volume of the grinding gas, preferably from 5 to 175 $mg/m^3$.

The concentration of the alkaline grinding aid added to the grinding gas is chosen to obtain an atmosphere in the grinding chamber with a pH greater than 8. Thus, in a preferred embodiment of the invention the step of adding the alkaline grinding aid to the grinding gas comprises adjusting the concentration of the alkaline grinding aid added to obtain an atmosphere in the grinding chamber with a pH greater than 8, preferably ranging from 10 to 12.

The process according to the invention has no requirement as to temperature. However an increase of the throughput has been noted with increased temperature. Without being bound by a theory, it is believed that the strongly alkaline effect of ammonia gas, in particular at higher temperatures, triggers the swelling that is caused by alkalis. As a result of this swelling process, the binding forces of the layers, in the case of layered minerals, are weakened and, under acceleration and shearing of the particles, they become detached direction-dependently. Thus, in another preferred embodiment of the invention, the grinding gas is used at a temperature ranging from 150° C. to 350° C., when being added with alkaline grinding aid.

The process of the invention is performed using a fluidized bed jet mill or a spiral jet mill. As known to the man skilled in the art such jet mills comprise a grinding chamber in which high-energy grinding jets generated by a compressed gaseous fluid (i.e. the grinding gas) cause continuous collisions between the particles and between the particles, and consequently their micronisation. In a preferred embodiment, the process is performed using a spiral jet mill.

The flow action in the grinding chamber of a spiral jet mill is very complex. Comminuting and classifying processes occur simultaneously. The comminution preferably takes place on the rear side of the grinding jets and to a very small extent on their front side.

This phenomenon can be explained as follows: a circular basic flow builds up in the grinding chamber. It is charged with particles of the material being ground. The grinding gas that is introduced into the grinding chamber crosses the basic flow. As a result, the latter is retarded and the basic flow charged with the material being ground builds up on the front side of the grinding jets. As a consequence, positive pressure builds up there, while an area of negative pressure is produced on the rear side of the jets; the grinding jets are deformed in a kidney-shaped manner. The basic flow is diverted around the grinding jets. In the area of negative pressure behind the grinding jets, gas is sucked in and vortices form. Under the influence of the vortices, the particles of solid matter that have been taken up by the grinding jets also move transversely in relation to the direction of the grinding jets, with the effect that impact between particles occurs very easily. Depending on at what point the particles enter the grinding jets, they are accelerated over differing distances. This results in great relative velocities between the particles that have just entered the grinding jet and the particles that are being transported in the grinding direction. The probability of collisions on the rear side of the grinding jets becomes very great. On the front side of the grinding jets, a small degree of comminution can be observed if the velocity of the particles in the basic flow is very high in comparison with the velocity of the grinding gas in the grinding jet. Then the particles are capable of penetrating a little way into the grinding jets from the front, though not as far as the core of the jet, and the probability of interparticulate collisions increases in the way described above.

The grinding gas flows out of grinding nozzles into the grinding chamber in the plane of the driving jet. In the inner zone of the plane, gas is thereby entrained from the periphery of the grinding jets into the flow. This causes an area of negative pressure to occur in the direct vicinity of the grinding nozzles. For reasons of continuity, gas therefore flows back towards the periphery of the grinding chamber in the outer zone of the plane. The flow profile of the plane is primarily determined by the grinding jets. The grinding jets are deformed in a kidney-shaped manner under the influence of the basic flow and flow spirally inwards. Gas that flows in the vortex region transversely in relation to the direction of the grinding jets is sucked in from the plane.

The angle and the pressure the grinding gas is blown tangentially into the grinding chamber have been found to determine the profile of the flow in the two planes.

Thus in a preferred embodiment of the invention, the grinding gas is fed under pressure to the grinding chamber through at least one jetting nozzle at an angle of between 40 and 60° to the tangent of the circular grinding chamber, preferably at an angle arranged from 48 to 60°. Preferably, the grinding gas is fed under pressure to the grinding chamber through a plurality of jetting nozzles, preferably from 4 to 6 jetting nozzles. However, it is also being possible, depending on requirements, for individual nozzles to be taken out of operation.

The optimum setting angle lies between 50° and 60° to the tangent of the circular grinding chamber. If the angle is smaller, the wall friction is too great and the material being ground is insufficiently accelerated. Choosing a larger angle failed in the conventional jet mills because too much coarse material left the grinding chamber through the outlet opening. This is prevented however by the use of an integrated dynamic classifier in the jet mill.

It is understood that by the choice of the setting angle of the nozzles, the process of the invention influences the geometry of the collisions in such a way that frontal and lateral collisions are prevented. The choice of the setting angles of the nozzle makes the particles collide tangentially with the wall of the vessel and with themselves.

In order that particles can impact one another, the average length of the free distance between the particles must be less than their flying distance, i.e. the retarding distance of the particles as a result of air friction. Therefore, the average length of the free distance must be as small as possible and the flying distance as great as possible. That is the case under the conditions that, on the one hand, there is a low proportion of void volume in the grinding chamber and, on the other hand, the particles have a high initial velocity and a great density. To this end, the invention uses distortional and tensile forces acting on the particles during the acceleration. The acceleration effect is all the greater the less the air jet flowing in through the nozzles is widened, and thereby loses energy.

Therefore in a preferred embodiment, the at least one jetting nozzle used in the process and in the jet mill according to the invention, is of the Laval type. Preferably, all the nozzles are of the Laval type.

Figure 2:
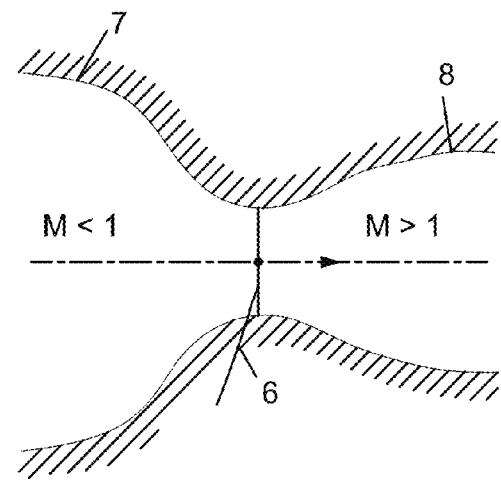
FIG. 2 is a cross section of a Laval nozzle.

Nozzles that operate on the Laval principle are described for example in U.S. Pat. No. 5,683,039. Laval nozzles are schematically represented in FIG. 2. In the case of Laval nozzles, the grinding gas enters the nozzle at subsonic velocity (M<1) and is accelerated by the convergent nozzle profile (7). In the narrowest cross section (6), the grinding gas finally reaches sonic velocity (M=1). The gas is accelerated further by the divergent shape (8) and finally leaves the end of the nozzle again at supersonic velocity (M>1), i.e. a velocity greater than 343 m/s. Directly after leaving the nozzle, there is a slight subsequent expansion in comparison with conventional nozzles, so that the gas jet scarcely widens. As a result, the particles are accelerated optimally.

Compared with conventional, usually conical nozzle geometries, it has been found that the decelerating effect of the flow is reduced by the use of Laval nozzles.

Since, as is known, the particle diameter of the charged material has an exponential influence with the square of the flying distance, whereas it only has a linear influence on the average length of the free distance, it follows that greater collisions occur with coarser particles. In practice, this has the consequences that grinding material charging must be so great that there can be interparticulate impact and friction, but also the charging must not be so high that the flow responsible for the acceleration of the particles is decelerated too much. Furthermore, the grinding pressure must be chosen such that the particles are accelerated with sufficient force.

Thus according to a preferred embodiment of the invention, the grinding gas added with grinding aid is fed into the grinding chamber at a pressure of ranging from 2 to 15 bar, preferably at a pressure ranging from 5 to 10 bar.

A flow field is built up, in which the product particles collide with great energy with themselves and with the wall of the grinding chamber. The desired comminution thereby takes place. The ground particles are discharged by way of an integrated dynamic classifier. The deposition of the particles thus obtained by the air or the grinding gas takes place in a special filter. For further deposition, a cyclone may also be used.

Figure 3:
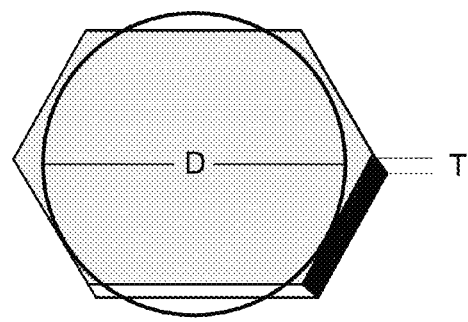
FIG. 3 illustrates the method of determination of the aspect ratio of a micronized particle.
Figure 4:
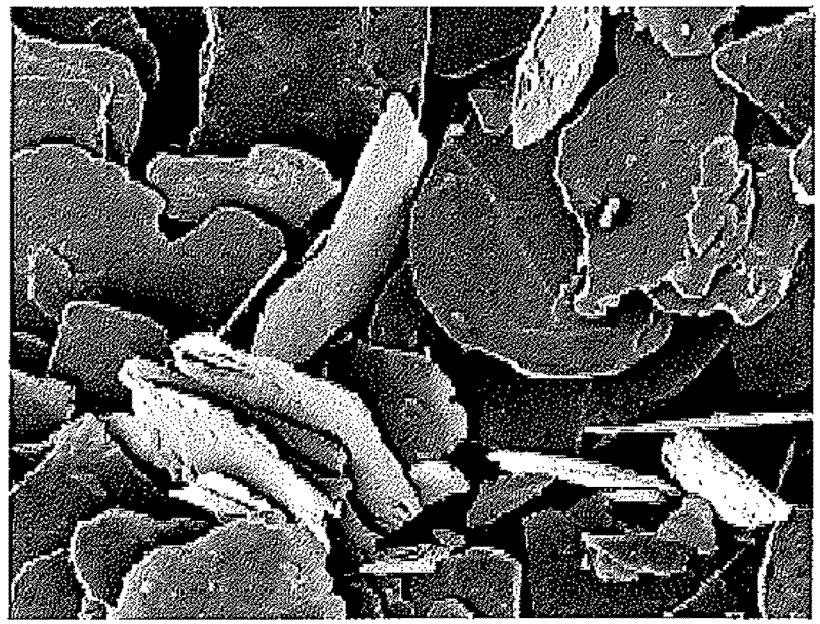
FIG. 4 is a picture illustrating the morphology of particles of graphite obtained by the process according to the invention.
Figure 5:
FIG. 5 is a picture illustrating the morphology of particles of graphite obtained by conventional grinding technique.

The particles produced have an aspect ratio of greater than 2, preferably of greater than 10, particularly preferably of greater than 20. Advantageously, these aspect ratios lie in the range of greater than 2 to 100, more preferably in the range from greater than 10 to 100 and most preferably in the range from greater than 20 to 100. The aspect ratio is understood as meaning the largest circular diameter (D) of the area of the flake in relation to the thickness (T) of the flake as illustrated in FIG. 3.

The particles produced have a specific surface area according to BET is less than 15 m$^2$/g, preferably less than 10 m$^2$/g and more preferably less than 5 m$^2$/g. The method according to BET (DIN 66131) should be used for determining the specific surface area. In preparing the samples, the degassing temperature used is ranging from 200 to 300° C., preferably from 200 to 250° C. The degassing time is ranging from 15 to 30 min.

The average particle size $d_{50}$ of the particle produced with the process and jet mill of the invention is less than 20 μm, preferably less than 10 μm and more preferably less than 5 μm. The average particle size $d_{50}$ is determined by laser diffraction method according to ISO 13320.

EXAMPLES

Example 1

Cleaned natural graphite with an initial average grain size $d_{50}$ of 100 mesh (about 150 μm) is fed into a spiral jet mill. The grinding gas used is compressed air and originates from an oillessly operating screw compressor and is fed in at about 160° C. into the collecting opening (1) at a pressure of 8 bar. At the same time, ammonia gas is fed at a rate of 170 mg/m$^3$ from a gas cylinder by way of the collecting opening (1). The mixture of air doped with ammonia gas is distributed among six Laval nozzles and flows into the grinding space at an angle of 58° to the tangent of the circular grinding chamber. The collected ground graphite particles have an average grain size $d_{50}$ of 5 μm, an aspect ratio of 55 and a specific surface area according to BET of 4.5 m$^2$/g.

Example 2

Cleaned natural graphite according to Example 1 is fed into a spiral jet mill. The grinding gas used is superheated steam at 320° C. which is fed at a pressure of 8 bar. The grinding gas is added with ammonia gas at a concentration of 175 mg/m$^3$. Six Laval nozzles arranged at an angle of 55° to the tangent of the circular grinding chamber are used over the circumference of the mill. The collected ground graphite particles have an average grain size $d_{50}$ of 4.5 μm, an aspect ratio of 63 and a specific surface area according to BET of 4.1 m$^2$/g.

Example 3

Calcined petroleum coke with an initial average grain size $d_{50}$ of about 2 mm is fed into a spiral jet mill. The grinding gas used is compressed air and originates from an oillessly operating screw compressor. The grinding gas is fed in at about 160° C. into the collecting opening (1) at a pressure of 7 bar. The compressed air is doped with an ammonia gas at a concentration of 100 mg/m$^3$. Six Laval nozzles at an angle of 48° to the tangent of the circular grinding chamber are used over the circumference of the mill. The collected ground petroleum coke particles have an average grain size $d_{50}$ of 3.8 μm, an aspect ratio of 61 and a specific surface area according to BET of 4.9 m$^2$/g.

Example 4

Hexagonal boron nitride with an initial average grain size $d_{50}$ of 80 μm is fed into a spiral jet mill, and ground under the same grinding conditions described in example 1. The collected particles have an average grain size $d_{50}$ of 1.5 μm, an aspect ratio of 75 and a specific surface area according to BET of 6.9 m$^3$/g.

The invention claimed is:

1. A process comprising:
   providing a jet mill comprising a grinding chamber and at least one jetting nozzle to feed grinding gas into said grinding chamber;
   providing particles of layered structure material having an interplanar distance ranging from 0.30 nm to 0.40 nm as measured by X-ray diffraction method into the grinding chamber;
   feeding grinding gas under pressure to the grinding chamber through the at least one jetting nozzle to perform micronisation of the particles; and
   collecting micronized particles;
   wherein an alkaline grinding aid is added to the grinding gas before said grinding gas is fed into the grinding chamber.

2. The process according to claim 1, wherein the particles of layered structure material comprise natural graphite, synthetic graphite, petroleum coke, pitch coke, anthracite, hexagonal boron nitride, or clay minerals.

3. The process according to claim 1, wherein the alkaline grinding aid is ammonia gas.

4. The process according to claim 1, wherein the alkaline grinding aid is added to the grinding gas in a concentration ranging from 5 to 500 mg/m$^3$.

5. The process according to claim 1, further comprising adjusting a concentration of the alkaline grinding aid added to the grinding gas to obtain an atmosphere in the grinding chamber with a pH greater than 8.

6. The process according to claim 1, wherein the grinding gas is at temperature ranging from 150° C. to 350° C. when the alkaline grinding aid is added to the grinding gas.

7. The process according to claim 1, wherein the grinding gas is fed to the grinding chamber with the alkaline grinding aid at a pressure of ranging from 2 to 15 bar; the grinding chamber is a circular grinding chamber and the at least one jetting nozzle is arranged at an angle of between 40 and 60° to the tangent of the circular grinding chamber; or combinations thereof.

8. The process according to claim 1, wherein the grinding gas is air or steam.

9. The process according to claim 1, wherein the grinding gas with the alkaline grinding aid are accelerated to a supersonic velocity when fed under pressure to the grinding chamber.

10. The process according to claim 1, wherein the micronized particles have an average particle size $d_{50}$ less than 20 µm determined according to ISO 13320; a specific surface area according of less than 15 m$^2$/g, the specific surface area being determined by BET method according to DIN 66131; an aspect ratio of greater than 2, the aspect ratio being the ratio of the largest circular diameter of the area of a micronized particle to the thickness of said particle; or combinations thereof.

11. A jet mill for grinding particles of layered structure material, the jet mill comprising:
    means to feed particles for grinding;
    a circular grinding chamber for the micronisation of the particles;
    at least one jetting nozzle to feed grinding gas into said grinding chamber wherein the at least one jetting nozzle is arranged at an angle of between 40 and 60° to the tangent of the circular grinding chamber;
    means to feed grinding gas under pressure to the at least one jetting nozzle;
    means to discharge the micronized particles; and
    means for adding grinding aid to the grinding gas upstream of the at least one jetting nozzle;
    wherein the jet mill is a spiral jet mill.

12. The jet mill of claim 11, wherein the spiral jet mill comprises a plurality of nozzles.

13. The jet mill according to claim 11, wherein at least one jetting nozzle is of the Laval type.

14. The jet mill according to claim 11, wherein the means to discharge the micronized particles is a dynamic classifier device.

15. Micronized particles, of an average particle size $d_{50}$ less than 20 µm determined according to ISO 13320, having:
    a specific surface area according of less than 15 m$^2$/g, the specific surface area being determined by BET method according to DIN 66131;
    an aspect ratio of between 20 and 100, the aspect ratio being the ratio of the largest circular diameter of the area of the micronized particle to the thickness of said particle; or combinations thereof;
    wherein the micronized particles are obtained from a layered structure material having an interplanar distance ranging from 0.30 nm to 0.40 nm as measured by X-ray diffraction method.

16. The micronized particles of claim 15, wherein the micronized particles comprise natural graphite or synthetic graphite.

17. The micronized particles of claim 15, wherein the micronized particles comprise petroleum coke, pitch coke, anthracite, hexagonal boron nitride, or clay minerals.

* * * * *